(12) United States Patent
Haddadin et al.

(10) Patent No.: US 11,370,117 B2
(45) Date of Patent: Jun. 28, 2022

(54) COLLISION HANDLING BY A ROBOT

(71) Applicant: FRANKA EMIKA GMBH, Munich (DE)

(72) Inventors: Sami Haddadin, Hannover (DE); Jonathan Vorndamme, Munich (DE)

(73) Assignee: Franka Emika GmbH, Munich (DE)

( * ) Notice: Subject to any disclaimer, the term of this patent is extended or adjusted under 35 U.S.C. 154(b) by 233 days.

(21) Appl. No.: 16/611,643

(22) PCT Filed: May 29, 2018

(86) PCT No.: PCT/EP2018/064075
§ 371 (c)(1),
(2) Date: Nov. 7, 2019

(87) PCT Pub. No.: WO2018/219952
PCT Pub. Date: Dec. 6, 2018

(65) Prior Publication Data
US 2020/0061835 A1 Feb. 27, 2020

(30) Foreign Application Priority Data

May 29, 2017 (DE) .................. 10 2017 005 080.5

(51) Int. Cl.
*B25J 9/16* (2006.01)
*B25J 9/00* (2006.01)
*B25J 13/08* (2006.01)

(52) U.S. Cl.
CPC .......... *B25J 9/1676* (2013.01); *B25J 9/0006* (2013.01); *B25J 9/0081* (2013.01); *B25J 9/161* (2013.01);
(Continued)

(58) Field of Classification Search
CPC ...... B25J 9/1607; B25J 9/1674; B25J 9/1676; B25J 9/1694; G05B 2219/40201; G05B 2219/40317
(Continued)

(56) References Cited

U.S. PATENT DOCUMENTS 8,010,180 B2 * 8/2011 Quaid .................. A61N 1/0534
600/424
8,287,522 B2 * 10/2012 Moses .................... A61B 34/76
606/1
(Continued)

FOREIGN PATENT DOCUMENTS

| JP | 2002-283276 A | 10/2002 |
|---|---|---|
| JP | 2016-511699 A | 4/2016 |
| KR | 10-2017-0041678 A | 4/2017 |

OTHER PUBLICATIONS

International Preliminary Report on Patentability issued in International Application No. PCT/EP2018/064075 dated Dec. 12, 2019.
(Continued)

*Primary Examiner* — Dalena Tran
(74) *Attorney, Agent, or Firm* — Hoffmann & Baron, LLP

(57) ABSTRACT

The invention relates to a method of collision handling for a robot with a kinematic chain structure comprising at least one kinematic chain, wherein the kinematic chain structure includes: a base, links, joints connecting the links, actuators and at least one end-effector, a sensor $S_{distal,i}$ in the most distal link of at least one of the kinematic chains for measuring/estimating force/torque, and sensors $S_i$ for measuring/estimating proprioceptive data, wherein the sensors $S_i$ are arbitrarily positioned along the kinematic chain structure, the method including: providing a model describing the dynamics of the robot; measuring and/or estimating with sensor $S_{distal,i}$ force/torque $F_{ext,S,distal,i}$ in the most distal link of at least one of the kinematic chains; measuring and/or
(Continued)

estimating with the sensors $S_i$ proprioceptive data: base and robot generalized coordinates $q(t)$ and their time derivative $\dot{q}(t)$, generalized joint motor forces $\tau_m$, external forces $F_S$, a base orientation $\varphi_B(t)$ and a base velocity $\dot{x}(t)_B$; generating an estimate $\hat{\tau}_\in$ of the generalized external forces $\tau_{ext}$ with a momentum observer based on at least one of the proprioceptive data and the model; generating an estimate $\ddot{q}(t)$ of a second derivative of base and robot generalized coordinates $\ddot{q}(t)$, based on $\hat{\tau}_\in$ and $\tau_m$; estimating a Cartesian acceleration $\ddot{x}_D$ of point D on the kinematic chain structure based on $\ddot{q}(t)$; compensating the external forces $F_D$ for rigid body dynamics effects based on $\ddot{x}_D$ and for gravity effects to obtain an estimated external wrench $\hat{F}_{ext,S,i}$; compensating $\hat{\tau}_\in$ for the Jacobian $J_{S.distal.i}^T$ transformed $\hat{F}_{ext,S.distal.i}$ to obtain an estimation $\hat{\tau}_{ext,col}$ of generalized joint forces originating from unexpected collisions; detecting a collision based on given thresholds $\tau_{thresh}$ and $F_{S.i,thresh}$ if $\hat{\tau}_{ext,col} > \tau_{thresh}$ and/or if $\hat{F}_{ext,S.i} > F_{S.i,thresh}$.

22 Claims, 3 Drawing Sheets

(52) U.S. Cl.
 CPC ........... *B25J 9/1607* (2013.01); *B25J 9/1694* (2013.01); *B25J 13/08* (2013.01)
(58) Field of Classification Search
 USPC ............... 700/245, 246; 703/2, 7; 74/479.01
 See application file for complete search history.

(56) References Cited

U.S. PATENT DOCUMENTS

| | | | |
|---|---|---|---|
| 10,478,969 | B2 | 11/2019 | Caldas et al. |
| 10,500,002 | B2* | 12/2019 | Simaan .................. A61B 34/71 |
| 2016/0008988 | A1* | 1/2016 | Kennedy .................... B25J 9/06 |
| | | | 414/738 |
| 2017/0173791 | A1 | 6/2017 | Dalibard et al. |

OTHER PUBLICATIONS

Jonathan Vorndamme, et al., "Collision detection, isolation and identification for humanoids", 2017 IEEE International Conference on Robotics and Automation (ICRA), May 29-Jun. 3, 2017, pp. 4754-4761, Singapore.
Anonymous, "Program and Proceedings—Cloud Platform and Mobile App", ICRA 2017, IEEE International Conference on Robotics and Automation 2017, Sep. 5, 2018, Singapore.
Anonymous, "Registration", ICRA 2017, IEEE International Conference on Robotics and Automation 2017, May 21, 2017, Singapore.
K. Bouyarmane, et al., "On the dynamics modeling of free-floating-base articulated mechanisms and applications to humanoid whole-body dynamics and control", International Conference on Humanoid Robots, Nov. 29-Dec. 1, 2012, Osaka, Japan.
Flacco Fabrizio, et al., "Residual-based contacts estimation for humanoid robots", 2016 IEEE-RAS 16th International Conference on Humanoid Robots (Humanoids), IEEE, Nov. 15, 2016, pp. 409-415, Cancun, Mexico.
Filippo D'ippolito, et al., "Contact Estimation in Robot Interaction", International Journal of Advanced Robotic Systems, vol. 11, Jan. 1, 2014, pp. 1-10.
English-language translation of Office Action (Summary) issued in Japanese Application No. 2019-566299 dated Mar. 4, 2021.

Dahiya, R., et al., "Directions Toward Effective Utilization of Tactile Skin: A Review", IEEE Sensors Journal 13, No. 11, pp. 4121-4138, 2013.
De Luca, A., et al., "Collision Detection and s~Safe Reaction With the DLR-III Lightweight Manipulator Arm", 2006 IEEE/RSJ International Conference on Intelligent Robots and Systems, pp. 1623-1630. IEEE, 2006.
De Luca, A., et al., "Actuator Failure Detection and Isolation Using Generalized Momenta", 2003 IEEE International Conference on Robotics and Automation (Cat. No. 03CH37422), vol. 1, pp. 634-639. IEEE, 2003.
De Luca, A., et al., "An Adapt-and-Detect Actuator FDI Scheme for Robot Manipulators", IEEE International Conference on Robotics and Automation, 2004, Proceedings. ICRA'04. 2004, vol. 5, pp. 4975-4980. IEEE, 2004.
De Luca, A., et al., "Sensorless Robot Collision Detection and Hybrid Force/Motion Control", Proceedings of the 2005 IEEE International Conference on Robotics and Automation, pp. 999-1004. IEEE, 2005.
Hyon, S., et al., "Full-Body Compliant Human-Humanoid Interaction: Balancing in the Presence of Unknown External Forces", IEEE Transactions on Robotics vol. 23, No. 5, pp. 884-898, 2007.
Kuntze, H. B., et al., "Fault Tolerant Supervisory Control of Human Interactive Robots", IFAC Workshop on Advanced Control and Diagnosis, Duisburg, D. 2003.
Lumelsky, V., et al., "Real-Time Collision Avoidance in Teleoperated Whole-Sensitive Robot Arm Manipulators", IEEE Transactions on Systems, Man, and Cybernetics vol. 23, No. 1, pp. 194-203, 1993.
OTT, C., et al., "Kinesthetic Teaching of Humanoid Motion Based on Whole-Body Compliance Control With Interaction-Aware Balancing", 2013 IEEE/RSJ International Conference on Intelligent Robots and Systems, pp. 4615-4621. IEEE, 2013.
Radford, N., et al., "Valkyrie: Nasa's First Bipedal Humanoid Robot", Journal of Field Robotics 32, No. 3, pp. 397-419, 2015.
Strohmayr, M., Ph.D Thesis: "Artificial Skin in Robotics." Karlsruhe Institute of Technology, 2012.
Vorndamme, J., et al., "Soft Robotics for the Hydraulic Atlas Arms: Joint Impedance Control with Collision Detection and Disturbance Compensation", 2016 IEEE/RSJ International Conference on Intelligent Robots and Systems (IROS), pp. 3360-3367, IEEE, 2016.
Demaria, G., et al., "Force/tactile Sensor for Robotic Applications", Sensors and Actuators A: Physical, 175 (2012), 60-72.
Morinaga, S., et al., "Collision Detection System for Manipulator Based on Adaptive Impedance Control Law", Proceedings of the 2003 IEEE, ICRA, Taiwan, Sep. 14-19, 2003.
Sotoudehnejad, V., et al., "Velocity-Based Variable Thresholds for Improving Collision Detection in Manipulators", 2014 IEEE ICRA, Hong Kong, May 31-Jun. 7, 2014.
Sotoudehnejad, V., et al., "Counteracting Modeling Errors for Sensitive Observer-Based Manipulator Collision Detection", 2012 IEEE/RSJ Int. Conf. on IROS, Portugal, Oct. 7-12, 2012.
Suita, K., et al., "A Failure-to-Safety "Kyozon" System with Simple Contact Detection and Stop Capabilities for Safe Human-Autonomous Robot Coexistence", IEEE ICRA, 1995.
Takakura, S., et al., "An Approach to Collision Detection and Recovery Motion in Industrial Robot", In IECON, 1989.
Yamada, Y. et al., "Human-Robot Contact in the Safeguarding Space", IEEE/ASME Transactions on Mechatronics, vol. 2, No. 4, Dec. 1997.
English-language translation of Office Action (Summary) issued in KR 10-2019-7037981 dated May 4, 2021.
Open Source Robotics Foundation, "DRC simulator", https://bitbucket.org/osrf/drcsim. [Online], 2015.
Haddadin, S., "Towards Safe Robots", Springer Berlin Heidelberg, 2014.

* cited by examiner

COLLISION HANDLING BY A ROBOT

CROSS-REFERENCE TO RELATED APPLICATIONS

The present application is the U.S. National Phase of PCT/EP2018/064075, filed on 29 May 2018, which claims priority to German Patent Application No. 10 2017 005 080.5, filed on 29 May 2017, the entire contents of which are incorporated herein by reference.

BACKGROUND

Field

The invention relates to a method of collision handling for a robot and to a robot designed and set up to carry out the method.

Related Art

Humanoid robots executing manipulation tasks are usually in contact with their environment at several contact points. The robot is in contact with its environment at the feet via ground contacts and the hands for executing a desired manipulation task. In order to correctly react to undesired collisions, such as an unwanted contact with a colliding object at the knee, the robot has to have the ability to detect collisions, analyze the contact situation(s) and react accordingly. In summary, the collision has to be detected, isolated and identified. Several approaches to the problem of collision detection for manipulators exist. In publications [22] and [19], a model based reference torque is compared to the actuator torque measured via motor currents. Publication [12] uses a similar approach with an adaptive impedance controller. Publication [20] observes disturbance torques on a per joint basis, ignoring the coupling between the joints. All of the above methods employ time invariant thresholds for collision detection. An approach with time variant thresholds based on the estimated modeling error can be found in publications [17] and [16], where a generalized momentum based observer is used to estimate the disturbance torques in the joints and bounds for the modeling errors. A drawback of all the aforementioned methods is that they require acceleration measurements, which generally introduce high noise. Usually, approaches to finding the contact location (collision isolation) utilize tactile skins as disclosed in publications [2], [11], [10], and [18]. With a suitable tactile skin, the contact location can be found precisely and robustly. However, it is desirable to be able to do so without the need of additional sensors, using only proprioceptive sensing.

Collision identification aims at finding an external contact wrench $F_{ext}$ and an external generalized joint force $\tau_{ext}$. External joint torque estimation for serial link robots with a fixed base was proposed in publication [6], which was then extended to and validated for flexible joint robots with the DLR (German Aerospace Center) lightweight robot in publication [3]. This was the first method to simultaneously detect collisions, find the contact location, and estimate the external torques, i.e., solve the first three phases of the collision handling problem. The approach utilizes the decoupling property of a generalized momentum based disturbance observer disclosed in publications [4] and [9], which does not rely on the measurement of accelerations. Contact wrenches are often determined with the help of force/torque sensors. Publication [14] uses a generalized momentum based disturbance observer with directly excluded measured foot forces to estimate only external joint torques resulting from manipulation for the humanoid robot TORO. For contact force estimation contacts at the hands were assumed. In publication [8], the ground contact forces at the feet of a humanoid robot are estimated with an optimal load distribution approach based on desired gross applied force. For the NASA robot "Valkyrie" these are measured with force/torque sensors located in the ankles as disclosed in publication [15].

SUMMARY

It is the task of the invention to provide a more effective detection to the end of identification and isolation of collisions of robots, especially of humanoids.

A first aspect of the invention relates to a method of collision handling for a robot with a kinematic chain structure comprising at least one kinematic chain, wherein the kinematic chain structure includes: a base, links, joints connecting the links, actuators and at least one end-effector, a sensor $S_{distal.i}$ in the most distal link of at least one of the kinematic chains for measuring/estimating force/torque, and sensors $S_i$ for measuring/estimating proprioceptive data, wherein the sensors $S_i$ are arbitrarily positioned along the kinematic chain structure.

The method according to the first aspect including the following steps:

providing a model describing the dynamics of the robot;

measuring and/or estimating with sensor $S_{distal.i}$ force/torque $F_{ext,S.distal.i}$ in the most distal link of at least one of the kinematic chains;

measuring and/or estimating with the sensors $S_i$ proprioceptive data: base and robot generalized coordinates $q(t)$ and their time derivative $\dot{q}(t)$, generalized joint motor forces $\tau_m$, external forces $F_S$, a base orientation $\varphi_B(t)$ and a base velocity $\dot{x}(t)_B$;

generating an estimate $\hat{\tau}_e$ of the generalized external forces $\tau_{ext}$ with a momentum observer, based on at least one of the proprioceptive data and the model;

generating an estimate $\ddot{q}(t)$ of a second derivative of base and robot generalized coordinates $\ddot{q}(t)$, based on $\hat{\tau}_e$ and $\tau_m$;

estimating a Cartesian acceleration $\ddot{x}_D$ of point D on the kinematic chain structure based on $\ddot{q}(t)$;

compensating $F_S$ for rigid body dynamics effects based on $\ddot{x}_D$ and for gravity effects to obtain an estimated external wrench $\hat{F}_{ext,S.i}$;

compensating $\hat{\tau}_e$ for the Jacobian $J_{S.distal.i}^T$ transformed $F_{ext,S.distal.i}$ to obtain an estimation $\hat{\tau}_{ext,col}$ of generalized joint forces originating from unexpected collisions; and detecting a collision based on given thresholds $\tau_{thresh}$ and $F_{S.i,thresh}$ if $\hat{\tau}_{ext,col} > \tau_{thresh}$ and/or if $\hat{F}_{ext,S.i} > F_{S.i,thresh}$.

On several occasions a running index i is used in the above and the following. The person skilled in the art will apprehend it as a statement to denote a respective element of a plurality of a finite—or possibly in some cases infinite—set, while the number of elements in a finite set can also be "one". In particular, if i refers to a respective numbering of collisions of the robot with external objects, and if only and for all times i=1 holds, it means that there is only one single collision. If i can be i=1 or i=2, there are two collisions to which reference can be made. The same applies beyond the numbering of collisions to the numbering of sensors and others.

The model describing the dynamics of the robot comprises, in particular, an information about the mass and, in particular, the mass distribution along the kinematic chain structure. From the latter, a moment of inertia of the kinematic chain structure is known as well.

The robot is preferably a humanoid robot, which is preferably modeled as:

$$\begin{pmatrix} M_{BB} & M_{BJ} \\ M_{JB} & M_{JJ} \end{pmatrix} \begin{pmatrix} \ddot{q}_B \\ \ddot{q}_J \end{pmatrix} + \begin{pmatrix} C_B(\dot{q}) \\ C_J(\dot{q}) \end{pmatrix} \begin{pmatrix} q_B \\ q_J \end{pmatrix} + \begin{pmatrix} g_B \\ g_J \end{pmatrix} = \begin{pmatrix} 0 \\ \tau_{Jm} \end{pmatrix} - \begin{pmatrix} 0 \\ \tau_{Jf} \end{pmatrix} + \begin{pmatrix} \tau_{Bext} \\ \tau_{Jext} \end{pmatrix} \quad (1)$$

where $q_B = (r_b, \varphi_B)^T$ and $q = (q_b, q_J)^T$ denote the base and robot generalized coordinates, consisting of the Cartesian base position $r_B \in \mathbb{R}^3$ Euler angle base orientation $\varphi_B \in \mathbb{R}^3$ and joint angles $q_J \in \mathbb{R}^{n_J}$. Base and joint entries are marked with index "B" and "J". Further, equation (1) can be written in the more compact form $$M(q)\ddot{q} + C(q,\dot{q})\dot{q} + g(q) = \tau_m - \tau_f + \tau_{ext} \quad (2)$$

where $M(q)$ denotes the mass matrix, $C(q, \dot{q})$ the matrix of centrifugal and Coriolis terms, $g(q)$ the gravity vector, where the dependency on q is left out for brevity in (1) and for sake of brevity $q(t)$ and its time derivatives are shortly written as q and $\dot{q}$ and so on. The vectors $\tau_m$, $\tau_f$ and $\tau_{ext}$ denote the generalized motor joint forces, friction joint forces and external joint forces. Cartesian forces $f_B$ and moments $m_B$ are projected to the base generalized rotation coordinates with the angular velocity Jacobian $J_\omega$ with $\omega_B = J_\omega(\varphi_B)\dot{\varphi}_B$. Generalized external forces $F_{ext,i}$ are projected via the corresponding geometric floating base Jacobian $J_{C,i}$ of the point of contact $r_{C,i}$ to the generalized joint forces $$\tau_{ext,i} = \begin{pmatrix} \tau_{B,ext,i} \\ \tau_{J,ext,i} \end{pmatrix} = J_{C,i}^T F_{ext,i} = \begin{pmatrix} I_3 & -S(r_{BC,i})J_\omega & RJ_{JtC,i} \\ 0 & J_\omega & RJ_{JRC,i} \end{pmatrix}^T \begin{pmatrix} f_{ext,i} \\ m_{ext,i} \end{pmatrix} \quad (3)$$

where $J_{JtC,i}$ and $J_{JRC,i}$ are the corresponding translational and rotational submatrices of the joint Jacobian and R is the rotation matrix from robot base to world frame, cf. publications [14] and [1].

The kinematic chain structure is preferably including joint torque sensing and an arbitrary number of sensors $S_i$ for measuring force/torque arbitrarily positioned along the kinematic chain structure. In addition, the base orientation $\varphi_B$ and the generalized base velocity $\dot{x}_B$ can be measured. Now the general objective is to detect, isolate and identify any collision of an external object with the kinematic chain structure. In this context, collision detection means, in particular, to generate a number of binary signals telling whether a collision is happening or not at a certain topological part of the robot. Isolation denotes to find the contact location $r_{C,i}$ for a collision i. Identification aims at estimating the generalized external joint force $\tau_{ext}$ and the external contact wrenches $F_{ext,i}$. In summary, the objective is to find all contact locations, the corresponding contact wrenches and telling which parts of the kinematic chain structure are in collision at the given time.

In particular, for the following measurement quantities, a measured and/or estimated value is provided as follows:
the base orientation $\varphi_B(t)$ and the base velocity $\dot{x}(t)_B$: obtained preferably with a gyroscope and/or a Kalman estimator;

for the links: $\tau_m$: with a force/torque sensor and $F_{ext,i}$ with a force/torque sensor; and for the end-effector(s): $F_{ext,i}$: with a force/torque sensor.

The estimate $\hat{\tau}_\in$ of the generalized external forces $\tau_{ext}$, generated by all contacts, is obtained with the help of a momentum observer and based on at least one of the proprioceptive data and the model. Preferably, a generalized momentum observer from publications [4], [5], and [7] is applied, which is defined as $$\hat{\tau}_\in = K_O - (M(q)\dot{q} - \int_0^t [\tau_m - \gamma(q,\dot{q}) + \hat{\tau}_\in] d\tilde{t}) \quad (4)$$

It generates an estimate $\hat{\tau}_\in$ of the generalized external forces acting on the kinematic chain structure, where $K_o = \text{diag}\{k_{O,i}\} > 0$ is the observer gain matrix and $$\gamma(q,\dot{q}) := n(q,\dot{q}) - \dot{M}(q)\dot{q} = g(q) + C(q,\dot{q})\dot{q} - \dot{M}(q)\dot{q} = g(q) - C^T(q,\dot{q})\dot{q} \quad (5)$$

due to the skew-symmetry of $\dot{M}(q) - 2C(q,\dot{q})$, cf. publication [3]. Under ideal conditions (q, $\dot{q}$, $M(q)$, $C(q, \dot{q})$, $g(q)$ are known exactly), the observer dynamics are decoupled and every component $\hat{\tau}_\in$ follows the first order dynamics:

$$K_O^{-1}\dot{\hat{\tau}}_\in + \hat{\tau}_\in = \tau_{ext} \quad (6)$$

Therefore, $\hat{\tau}_\in$ is simply a first order filtered version of $\tau_{ext}$.

In order to be able to determine a maximum number of contact wrenches and locations, the information of the force/torque sensors from the observed generalized external joint forces $\hat{\tau}_\in$ is preferably excluded as shown in publication [21]. Therefore, it is compensated for the dynamic and static forces generated by the inertia attached to each sensor. For this compensation, the acceleration in Cartesian space $\ddot{x}_D$ of its center of mass D is required. It is preferably calculated by $$\ddot{x}_D = \begin{pmatrix} \ddot{r}_D \\ \dot{\omega}_D \end{pmatrix}^T = J_D \ddot{q} + \dot{J}_D \dot{q} \quad (7)$$

where $J_D$ is the Jacobian of point D. For this, the generalized acceleration $\ddot{q}$ is needed to calculate the Cartesian acceleration. An estimate $\dot{\hat{q}}$ of $\ddot{q}$ can be obtained from extending the disturbance observer as shown in equation (4). Using its inner state, i.e., the generalized momentum $p = M(q)\dot{q}$, it follows for the estimate of its time derivative:

$$\dot{\hat{q}} = M(q)\ddot{q} + \dot{M}(q)\dot{q} = \tau_m - \gamma(q,\dot{q}) + \hat{\tau}_\in \quad (8)$$

From this, the estimated acceleration follows as:

$$\ddot{\hat{q}} = M(q)^{-1}(\dot{\hat{p}} - \dot{M}(q)\dot{q}) = M(q)^{-1}(\tau_m - n(q,\dot{q}) + \hat{\tau}_\in) \quad (9)$$

The dynamics of the acceleration error $e = \ddot{q} - \ddot{\hat{q}}$ derived using equation (8):

$$\begin{aligned} e &= M(q)^{-1}(\dot{p} - \dot{M}(q)\dot{q}) - M(q)^{-1}(\dot{\hat{p}} - \dot{M}(q)\dot{q}) \\ &= M(q)^{-1}(\tau_m - n(q,\dot{q}) + \tau_{ext} - (\tau_m - n(q,\dot{q})\hat{\tau}_\epsilon)) \\ &= M(q)^{-1}(\tau_{ext} + \hat{\tau}_\epsilon) \end{aligned} \quad (10)$$

Using the Laplace transform of equations (6) and (10), the following dynamics are obtained:

$$e = M(q)^{-1}\left(\frac{sk_{O,1}^{-1}\tau_{ext,1}}{1 + sk_{O,1}^{-1}} \cdots \frac{sk_{O,n}^{-1}\tau_{ext,n}}{1 + sk_{O,n}^{-1}}\right) \quad (11)$$

The error dynamics consist of a vector with a linear dynamics triggered by $\tau_{ext}$, which is coupled nonlinearly by the inverted mass matrix to the error e. The estimate $\ddot{q}$ is preferably used to obtain $\ddot{x}_D$ according to equation (7) and therefore the external wrench $F_{ext}$, as shown in the following.

The compensation of measured generalized external forces $F_S$ for rigid body dynamics effects based on $\ddot{x}_D$ and for gravity effects to obtain an estimated external wrench $\hat{F}_{ext,S,i}$ is preferably done as follows:

Considering a free body excerpt from a body abutting on an end-effector, Newton's second law yields for a sensor attached to this body:

$$m_D \ddot{r}_D = m_D g + f_{ext} - f_S \quad (12)$$

wherein $m_D$ is the body mass and its inertia tensor is $I_D$. There are generally gravitational and dynamic forces measured in the sensor, while the dynamic forces are visible in the left hand side of equation (12). It follows for the sensed external force:

$$\bar{f}_{ext,S} = f_S + m_D \ddot{r}_D - m_D g \quad (13)$$

Equation (13) shows that the sensor does not measure the pure external forces only, but in general also forces due to gravity and inertia. Thus, $F_S$ is to be corrected by these dynamics in order to obtain the true external wrench. To obtain the external moment, Euler's law of rigid body motion is applied to the center of gravity D of the body:

$$I_D \dot{\omega}_D + \omega_D \times I_d \omega_D = m_{ext,E} - m_S - r_{DS} \times f_S + r_{DE} \times f_{ext} \quad (14)$$

This leads to the sensed external moment $$m_{ext,S} := m_{ext,E} + r_{SE} \times f_{ext} = m_S + I_D \dot{\omega}_D + \omega_D \times I_D \omega_D + r_{DS} \times (f_S - f_{ext}) \quad (15)$$

Equations (13) and (14) result in the external wrench $$\bar{F}_{ext,S} = \begin{pmatrix} \bar{f}_{ext,S} \\ \bar{m}_{ext,S} \end{pmatrix} = F_S + \begin{pmatrix} m_D I_3 & 0 \\ m_D S(r_{SD}) & I_D \end{pmatrix} \left( \begin{pmatrix} \ddot{r}_D \\ \dot{\omega}_D \end{pmatrix} - \begin{pmatrix} g \\ 0 \end{pmatrix} \right) + \begin{pmatrix} 0 \\ \omega_D \times I_D \omega_D \end{pmatrix} \quad (16)$$

In equation (16), $I_3$ denotes the three dimensional unit matrix, g the Cartesian gravity vector, $r_{SD}$ the vector from the center of mass of the inertia attached to the sensor to the sensor and 0 the zero matrix of according size. The S operator denotes the skew-symmetric matrix representing the cross product with its argument. All entities are expressed in the world frame. Using $\ddot{q}$ instead of $\ddot{q}$ to computed $\ddot{x}_D$, the estimated external wrench in point S is preferably obtained as follows:

$$\hat{F}_{ext,S} = F_S + \begin{pmatrix} m_D I_3 & 0 \\ m_D S(r_{SD}) & I_D \end{pmatrix} \left( \begin{pmatrix} \ddot{r}_D \\ \dot{\omega}_D \end{pmatrix} - \begin{pmatrix} g \\ 0 \end{pmatrix} \right) + \begin{pmatrix} 0 \\ \omega_D \times I_D \omega_D \end{pmatrix} \quad (17)$$

If the sensor happens to be in a link not at the distal end of the kinematic chain, the compensation wrenches for each body b following the sensor in the kinematic chain become $$F_{c,b} = \begin{pmatrix} m_{D,b} I_3 & 0 \\ m_{D,b} S(r_{SD,b}) & I_{D,b} \end{pmatrix} \left( \begin{pmatrix} \ddot{r}_{D,b} \\ \dot{\omega}_D \end{pmatrix} - \begin{pmatrix} g \\ 0 \end{pmatrix} \right) + \begin{pmatrix} 0 \\ \omega_{D,b} \times I_{D,b} \omega_{D,b} \end{pmatrix} \quad (18)$$

which for all b are summed up for said compensation. This operation corresponds to the Newton-Euler method for calculating multibody dynamics. Therefore, in this case, the external wrench is, in particular, obtained by $$\hat{F}_{ext,S} = F_S + \Sigma_{b \in N(b_S)} F_{c,b} =: F_S + F_{cmp,S} \quad (19)$$

In equation (19), $N(b_S)$ denotes the set of bodies following in a distal direction limb $b_S$, which holds the sensor, in the kinematic chain.

In the following, a preferable way of compensating $\hat{\tau}_\in$ for the Jacobian $J_{S.distal,i}^T$ transformed $F_{ext,S.distal,i}$ to obtain an estimation $\hat{\tau}_{ext,col}$ of generalized joint forces originating from unexpected collisions is shown.

In particular, it is considered for the estimation of the generalized contact forces and also collision detection that the observer detects generalized external joint forces originating from all external contacts. As with a humanoid, there are in general always desired contacts (e.g., at the feet or at the hands during manipulation). These contact forces have to be measured with force/torque sensors close to the corresponding end-effectors (e.g. at the wrists and ankles) in order to enable exclusion from the observed generalized joint forces and avoid undesired collision detections ("false alarms"). Preferably, force/torque sensors $S_{distal,i}$ are attached to the kinematic chain structure in the distal links of the arms and legs of an humanoid robot. The generalized external joint forces generated by the external wrenches at the distal links are preferably subtracted from the observed generalized joint forces to obtain an estimate of generalized joint forces originating from unexpected collisions $\tau_{ext,col}$:

$$\hat{\tau}_{ext,col} \tilde{\tau}_\in = \Sigma_{S.distal} J_{S.distal,i}^T F_{ext,S.distal,i} \quad (20)$$

Now that the force/torque sensors are compensated and the desired generalized external forces are excluded from the observed generalized external forces, collision detection is preferably done as follows.

Collision detection is preferably done via thresholding with the generalized joint forces and estimated external wrenches, namely preferably if at least one of the following conditions (being checked element wise) is fulfilled:

$$\hat{\tau}_{ext,col} > \tau_{thresh}$$

$$\hat{F}_{ext,S,i} > F_{S,i,thresh} \quad (21)$$

It is an advantage of the invention that a new real-time method for acceleration estimation and load compensation in humanoid robots is provided for force/torque sensors that are arbitrarily located on the kinematic chain structure of a robot.

According to an embodiment of the invention, compensation wrenches for compensating the external forces $F_S$ for rigid body dynamics effects based on $\ddot{x}_D$ and for gravity effects to obtain an estimated external wrench $\hat{F}_{ext,S,i}$ are generated recursively if multiple sensors $S_i$ are attached to one of the joints or links.

Preferably, based on equation (19), for multiple sensors in a kinematic chain (e.g., in each joint), the compensation wrenches are calculated recursively to avoid multiple calculations according to this embodiment. Preferably, this is conducted according to the following algorithm, written herein in pseudo-code:

```
function F_cmp,S=calculate_F_cmp(S)
begin
  F_cmp,S: = 0
  for all bodies b directly following S do
```

-continued $$\ddot{x}_{D,b} = J_{D,b}\ddot{q} + \dot{J}_{D,b}\dot{q}$$

$$F_{cmp,S} \mathrel{+}= \begin{pmatrix} m_{D,b}I_3 & 0 \\ m_{D,b}S(r_{SD,b}) & I_{D,b} \end{pmatrix}\left(\hat{\ddot{x}}_{D,b} - \begin{pmatrix} g \\ 0 \end{pmatrix}\right) + \begin{pmatrix} 0 \\ \omega_{D,b} \times I_{D,b}\omega_{D,b} \end{pmatrix}$$

end
for all T ∈ N (S) do
$F_{cmp,T}$=calculate_F_cmp(T)

$$F_{cmp,S} \mathrel{+}= F_{cmp,T} + \begin{pmatrix} 0 \\ r_{ST} \times f_{ext,T} \end{pmatrix}$$

end
end

The algorithm uses the set N(S) which denotes all sensors directly following S in a distal direction. Directly means that there is no other sensor between S and an element of N(S) in the kinematic chain connecting the two.

It is an advantage of this embodiment to avoid multiple calculations.

According to another embodiment of the invention, the method further comprises the step of:
determine contact locations $r_C$ of collisions with the kinematic chain structure by calculating a line of force action $r_d+\lambda f_i/\|f_i\|$ with $r_d=(S^T(f_i))^\# m_i$ of the collision and by intersecting the line of force action with the kinematic chain structure geometry.

The information of equation (21) is preferably also used to roughly estimate the contact location. Contacts will always be locatable between the last joint or sensor exceeding the threshold and the next sensor not exceeding it. To gain more information on the link in contact, the external wrenches $F_{ext,i}$ are needed. In the following, a preferable way of obtaining $F_{ext,i}$ and how to use it for collision isolation is shown: Collision isolation cannot be generally handled for the case when external moments act along the robot. For this case, the contact location of an additionally acting contact force cannot be located exactly. Thus, for the isolation case it is assumed herein that no external moments to be acting on the robot ($m_{ext,E}$=0), which is a realistic assumption for most undesired collision situations. Isolation is done via the following four step approach: a) Isolate the contact link, b) estimate the external wrench acting on the respective contact link, c) calculate the line of action of the force estimated and d) determine the exact contact point by intersecting the line of action with the known kinematic chain structure geometry.

For steps b) and c) two main scenarios have to be distinguished: single contact and multi contact scenarios. The single contact scenario can be handled with joint torque sensing only, while the multi contact scenario sometimes requires additional force/torque sensors in order to distinguish the different contacts.

Regarding step a): The contact link can be found based on the fact that a contact cannot produce torques in joints appearing behind the contact location along the kinematic chain, e.g. a contact at the upper arm cannot produce torques in the wrist. Therefore, the contact link index i can be isolated by $$i=\max\{j|\tau_{ext,col,j}\neq 0\} \quad (22)$$

given the convention that joint j connects link j to the preceding links of the robot. Due to the tree structure of a humanoid, this procedure can lead to multiple potential contact links. It has to be noted also that due to modeling and measurement errors, equation (22) is subject to thresholding. Also some forces, e.g. forces parallel to the axis of the joint connected to the link they act on, do not produce torques at this joint. This may lead to erroneous estimation of the contact link. However, this problem can be tackled with a correction step introduced later.

Regarding step b): When the contact link is found, the wrench $F_i$ acting on the respective link is preferably estimated as $$F_i = (J_i^T)^\# \tau_{ext,col} \quad (23)$$

using the Moore-Penrose pseudo inverse of $J_i^T$: $(J_i^T)^\#$

Regarding step c): For a single external wrench $F_{ext}$, acting at the contact location $r_C$ the wrench $F_i$ may be expressed as $$F_i = J_{c,i} F_{ext} = \begin{pmatrix} I_3 & 0 \\ S^T(r_c) & I \end{pmatrix} F_{ext} \quad (24)$$

Recalling the assumption of the absence of external moments this results in $$F_i = \begin{pmatrix} f_i \\ M_i \end{pmatrix} = \begin{pmatrix} f_{ext} \\ S(r_C)f_{ext} \end{pmatrix} = \begin{pmatrix} f_i \\ S^T(f_i)r_c \end{pmatrix} \quad (25)$$

From equation (25), the line of action of the force is derived. It is described by $r_d+\lambda f_i/\|f_i\|$ for $\lambda \in \mathbb{R}$ with $$r_d=(S^T(f_i))^\# m_i \quad (26)$$

Regarding step d): Due to the properties of the pseudo inverse and the rank deficit of skew symmetric matrices, $r_d$ is the point along the line of action of the force, which lies closest to the origin and therefore not in general identical to $r_C$. It is possible to calculate $r_C$ by intersecting the line of action of the force with the link geometry of the contact link. If this intersection problem has more than one solution, the one with the smallest parameter $\lambda$ is chosen, as a pushing force is anticipated, which is most common for unexpected collisions. However, all candidates can be generated and utilized if more sophisticated processing is done at a higher level of abstraction. If the contact link is not estimated correctly, the contact point $r_C$ can nonetheless be computed for the single contact case, as the base movement provides sufficient information to determine it. In this case, the line of action may happen to not intersect the estimated contact link. Therefore, the contact point $r_C$ is preferably determined correctly by intersecting the line of action also with the subsequent links. For the case of multiple contacts, above method is preferably used in combination with force/torque sensing. Then, for each sensor, a contact in the kinematic chain following the sensor is preferably detected by applying steps 3 and 4 for the compensated (in the sense of equation (19)) wrenches $\hat{F}_{ext,i}$ of the sensors. In case of more than one sensor and more than one contact in the kinematic chain, the wrenches originating from contacts already measured by sensors closer to the distal end of the kinematic chain have to be subtracted from the measured wrench in order to estimate contacts earlier in the chain correctly.

$$\hat{F}_{ext,i} = \hat{F}_{ext,Si} - \sum_{T \in N(S)} \left( \hat{F}_{ext,T} + \begin{pmatrix} 0 \\ r_{ST} \times \hat{f}_{ext,T} \end{pmatrix} \right) \quad (27)$$

If no force/torque sensors are available, the correct isolation of multiple contacts is only possible if the contact links are estimated correctly and are far enough away from the base, which means that the Jacobians of the contact links together include at least six degree of freedoms per wrench to estimate. For this, the contact wrenches are preferably calculated by stacking the Jacobians together and calculating the according pseudoinverse $$(F_{i,1}^T \ldots F_{i,n}^T)^T = (J_{i,1}^T \ldots J_{i,n}^T)^{\#} \tau_{ext,col} \quad (28)$$

In case of a singularity in the Jacobians, additional degree of freedoms can be required to estimate the wrenches correctly. Thereafter, steps c) and d) can be applied to each estimated wrench $F_{i,j}$. This step may be considered a generalization of equation (6) in publication [14].

With this, the contact locations $r_C$ are located.

It is an advantage of this embodiment that a novel method for estimating contact location and contact forces in single contact scenarios, in particular, for humanoid robots is provided.

According to another embodiment of the invention, the method further comprises the step of:
based on the determined contact locations $r_C$ determine the full contact Jacobians $J_{C,i} = J_{c,i} J_i$, and determine the external wrenches: $(F_{ext,1}^T \ldots F_{ext,n}^T)^T = (J_{C,1}^T \ldots J_{C,n}^T)^{\#} \tau_{ext,col}$.

Since with the above, the contact locations $r_C$ are determined, the full contact Jacobians $$J_{C,i} = J_{c,i} J_i \quad (29)$$

are preferably computed. Similar to (28) they are preferably used to identify the external wrenches $$(F_{ext,1}^T \ldots F_{ext,n}^T)^T = (J_{C,1}^T \ldots J_{C,n}^T)^{\#} \tau_{ext,col} \quad (30)$$

For wrenches identified with a force/torque sensor, no action has to be taken in this step, as the corrected wrenches are already the best estimates.

It is an advantage of this embodiment that an extension of the above mentioned invention and its embodiments is provided to multi-contact situations with and without the help of additional force/torque sensors in the kinematic chain.

According to another embodiment of the invention, the method further comprises the step of:
control the robot dependent on $r_C$ and $(F_{ext,1}^T \ldots F_{ext,n}^T)^T$.

According to another embodiment of the invention, the robot is a humanoid robot.

Another aspect of the invention relates to computer system with a data processing unit, wherein the data processing unit is designed and set up to carry out a method according to one of the preceding claims.

Another aspect of the invention relates to a digital data storage with electronically readable control signals, wherein the control signals can coaction with a programmable computer system, so that a method according to one of the preceding claims is carried out.

Another aspect of the invention relates to a computer program product comprising a program code stored in a machine-readable medium for executing a method according to one of the preceding claims, if the program code is executed on a computer system.

Another aspect of the invention relates to a computer program with program codes for executing a method according to one of the preceding claims, if the computer program runs on a computer system.

Another aspect of the invention relates to a robot with a kinematic chain structure comprising at least one kinematic chain, wherein the kinematic chain structure comprises: a base, links, joints connecting the links, actuators and at least one end-effector, a sensor $S_{distal,i}$ in the most distal link of at least one of the kinematic chains for measuring/estimating force/torque, and sensors $S_i$ for measuring/estimating proprioceptive data, wherein the sensors $S_i$ are arbitrarily positioned along the kinematic chain structure, and wherein the robot is designed and set up to carry out a method according to the preceding claims.

According to an embodiment of the invention, the robot comprises a data interface with a data network, and wherein the robot is designed and set up to download system-programs for setting up and controlling the robot from the data network.

According to another embodiment of the invention, the robot being designed and set up to download parameters for the system-programs from the data network.

According to another embodiment of the invention, the robot is designed and set up to enter parameters for the system-programs via a local input-interface and/or via a teach-in-process, and wherein the robot is manually guided.

According to another embodiment of the invention the robot is designed and set up such that downloading system-programs and/or respective parameters from the data network is controlled by a remote station, the remote station being part of the data network.

According to another embodiment of the invention, the robot is designed and set up such that system-programs and/or respective parameters locally available at the robot are sent to one or more participants of the data network based on a respective request received from the data network.

According to another embodiment of the invention, the robot is designed and set up such that system-programs with respective parameters available locally at the robot can be started from a remote station, the remote station being part of the data network.

According to another embodiment of the invention, the robot is designed and set up such that the remote station and/or the local input-interface comprises a human-machine-interface HMI designed and set up for entry of system-programs and respective parameters, and/or for selecting system-programs and respective parameters from a multitude system-programs and respective parameters.

According to another embodiment of the invention, the human-machine-interface HMI being designed and set up such, that entries are possible via "drag-and-drop"-entry on a touchscreen, a guided dialogue, a keyboard, a computer-mouse, an haptic interface, a virtual-reality-interface, an augmented reality interface, an acoustic interface, via a body tracking interface, based on electromyographic data, based on electroencephalographic data, via a neuronal interface or a combination thereof.

According to another embodiment of the invention, the human-machine-interface HMI being designed and set up to deliver auditive, visual, haptic, olfactoric, tactile, electrical feedback, or a combination thereof.

The invention is explained above with reference to the aforementioned embodiments. However, it is clear that the invention is not only restricted to these embodiments, but includes all possible embodiments within the spirit and scope of the inventive thought and the patent claims.

The sources of prior art mentioned above and additional sources are the following publications:

[1] K. Bouyarmane and A. Kheddar. On the dynamics modeling of free-floating-base articulated mechanisms and applications to humanoid whole-body dynamics and control. *Humanoids*, 2012.

[2] R. S. Dahiya, P. Mittendorfer, M. Valle, et al. Directions toward effective utilization of tactile skin: A review. *IEEE Sensors Journal*, 2013.

[3] A. De Luca, A. Albu-Schäffer, S. Haddadin, and G. Hirzinger. Collision detection and safe reaction with the DLR-III lightweight manipulator arm. In *IROS*, 2006.

[4] A. De Luca and R. Mattone. Actuator failure detection and isolation using generalized momenta. In *ICRA*, 2003.

[5] A. De Luca and R. Mattone. An adapt-and-detect actuator fdi scheme for robot manipulators. In *ICRA*, 2004.

[6] A. De Luca and R. Mattone. Sensorless robot collision detection and hybrid force/motion control. In *ICRA*, 2005.

[7] S. Haddadin. *Towards Safe Robots*. Springer Berlin Heidelberg, 2014.

[8] S.-H. Hyon, J. Hale, and G. Cheng. Full-body compliant human-humanoid interaction: Balancing in the presence of unknown external forces. *IEEE Trans. Robot.*, 2007.

[9] H.-B. Kuntze, C. Frey, K. Giesen, and G. Milighetti. Fault tolerant supervisory control of human interactive robots. In *IFAC Workshop on Advanced Control and Diagnosis*, 2003.

[10] V. J. Lumelsky and E. Cheung. Real-time collision avoidance in tele-operated whole-sensitive robot arm manipulators. *IEEE Transactions on Systems, Man, and Cybernetics*, 1993.

[11] G. D. Maria, C. Natale, and S. Pirozzi. Force/tactile sensor for robotic applications. *Sensors and Actuators A: Physical*, 2012.

[12] S. Morinaga and K. Kosuge. Collision detection system for manipu-lator based on adaptive impedance control law. In *ICRA*, 2003.

[13] Open Source Robotics Foundation. "DRC simulator", https://bitbucket.org/osrf/drcsim. [Online], 2015.

[14] C. Ott, B. Henze, and D. Lee. Kinesthetic teaching of humanoid motion based on whole-body compliance control with interaction-aware balancing. In *IROS*, 2013.

[15] N. A. Radford, P. Strawser, K. Hambuchen, et al. Valkyrie: Nasa's first bipedal humanoid robot. *Journal of Field Robotics*, 2015.

[16] V. Sotoudehnejad and M. R. Kermani. Velocity-based variable thresh-olds for improving collision detection in manipulators. In *ICRA*, 2014.

[17] V. Sotoudehnejad, A. Takhmar, M. R. Kermani, and I. G. Polushin. Counteracting modeling errors for sensitive observer-based manipula-tor collision detection. In *IROS*, 2012.

[18] M. Strohmayr. *Artificial Skin in Robotics*. PhD thesis, Karlsruhe Institute of Technology, 2012.

[19] K. Suita, Y. Yamada, N. Tsuchida, et al. A failure-to-safety "kyozon" system with simple contact detection and stop capabilities for safe human-autonomous robot coexistence. In *ICRA*, 1995.

[20] S. Takakura, T. Murakami, and K. Ohnishi. An approach to collision detection and recovery motion in industrial robot. In *IECON*, 1989.

[21] J. Vomdamme, M. Schappler, A. Tödtheide, and S. Haddadin. Soft robotics for the hydraulic Atlas arms: Joint impedance control with collision detection and disturbance compensation. In *IROS*, 2016. Accepted and publicly available October 2016. Initial submission: https://www.irt.uni-hannover.de/fileadmininstitut/pdf/tmp/VorndammeSchToeHad2016.pdf.

[22] Y. Yamada, Y. Hirasawa, S. Huang, et al. Human-robot contact in the safeguarding space. IEE/ASME *Transactions on Mechatronics*, 1997.

DETAILED DESCRIPTION

Figure 1:
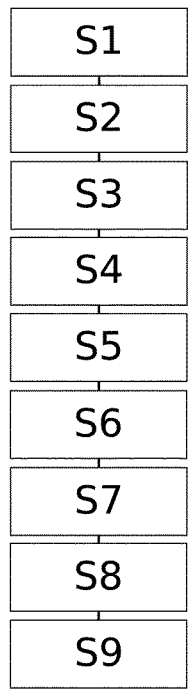
FIG. 1 shows a method for collision handling for a robot according to an embodiment of the invention.

FIG. 1 shows a method of collision handling for a robot 1 with a kinematic chain structure comprising at least one kinematic chain, wherein the kinematic chain structure includes: a base, links, joints connecting the links, actuators and at least one end-effector, a sensor $S_{distal,i}$ in the most distal link of at least one of the kinematic chains for measuring/estimating force/torque, and sensors $S_i$ for measuring/estimating proprioceptive data, wherein the sensors $S_i$ are arbitrarily positioned along the kinematic chain structure.

The method according to FIG. 1 includes the following steps:

providing (S1) a model describing the dynamics of the robot 1;

measuring and/or estimating (S2) with sensor $S_{distal,i}$ force/torque $F_{ext,S.distal,i}$ in the most distal link of at least one of the kinematic chains;

measuring and/or estimating (S3) with the sensors $S_i$ proprioceptive data: base and robot generalized coordinates $q(t)$ and their time derivative $\dot{q}(t)$, generalized joint motor forces $\tau_m$, external forces $F_S$, a base orientation $\varphi_B(t)$ and a base velocity $\dot{x}(t)_B$;

generating (S4) an estimate $\hat{\tau}_\in$ of the generalized external forces $\tau_{ext}$ with a momentum observer 3 based on at least one of the proprioceptive data and the model;

generating (S5) an estimate $\ddot{q}(t)$ of a second derivative of base and robot generalized coordinates $\ddot{q}(t)$, based on $\hat{\tau}_\in$ and $\tau_m$;

estimating (S6) a Cartesian acceleration $\ddot{x}_D$ of a point D on the kinematic chain structure based on $\ddot{q}(t)$;

compensating (S7) $F_S$ for rigid body dynamics effects based on $\ddot{x}_D$ and for gravity effects to obtain an estimated external wrench $\hat{F}_{ext,S,i}$;

compensating (S8) $\hat{\tau}_\in$ for the Jacobian $J_{S.distal,i}{}^T$ transformed $F_{ext,S.distal,i}$ to obtain an estimation $\tau_{ext,col}$ of generalized joint forces originating from unexpected collisions; and detecting (S9) a collision based on given thresholds $\tau_{thresh}$ and $F_{S,i,thresh}$ if $\hat{\tau}_{ext,col} > \tau_{thresh}$ and/or if $\hat{F}_{ext,S,i} > F_{S,i,thresh}$.

Figure 2:
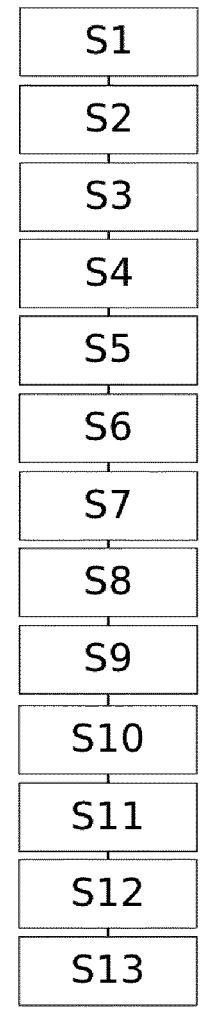
FIG. 2 shows a method for collision handling for a robot according to another embodiment of the invention.

FIG. 2 shows a method of collision handling for a robot 1 with a kinematic chain structure comprising at least one kinematic chain, wherein the kinematic chain structure comprises: a base, links, joints connecting the links, actuators and at least one end-effector, a sensor $S_{distal,i}$ in the most distal link of at least one of the kinematic chains for measuring/estimating force/torque, and sensors $S_i$ for measuring/estimating proprioceptive data, wherein the sensors $S_i$ are arbitrarily positioned along the kinematic chain structure.

The method according to FIG. 2 includes the following steps:
- providing S1 a model describing the dynamics of the robot 1;
- measuring and/or estimating (S2) with sensor $S_{distal,i}$ force/torque $F_{ext,S.distal,i}$ in the most distal link of at least one of the kinematic chains;
- measuring and/or estimating S3 with the sensors $S_i$ proprioceptive data: base and robot generalized coordinates $q(t)$ and their time derivative $\dot{q}(t)$, generalized joint motor forces $\tau_m$, external forces $F_S$, a base orientation $\varphi_B(t)$ and a base velocity $\dot{x}(t)_B$;
- generating (S4) an estimate $\hat{\tau}_\in$ of the generalized external forces $\tau_{ext}$ with a momentum observer 3 based on at least one of the proprioceptive data and the model;
- generating (S5) an estimate $\ddot{q}(t)$ of a second derivative of base and robot generalized coordinates $\ddot{q}(t)$, based on $\hat{\tau}_\in$ and $\tau_m$;
- estimating (S6) a Cartesian acceleration $\ddot{x}_D$ of a point D on the kinematic chain structure based on $\ddot{q}(t)$;
- compensating (S7) $F_S$ for rigid body dynamics effects based on $\ddot{x}_D$ and for gravity effects to obtain an estimated external wrench $\hat{F}_{ext,S.i}$;
- compensating (S8) $\hat{\tau}_\in$ for the Jacobian $J_{S.distal,i}^T$ transformed $F_{ext,S.distal,i}$ to obtain an estimation $\tau_{ext,col}$ of generalized joint forces originating from unexpected collisions;
- detecting (S9) a collision based on given thresholds $\tau_{thresh}$ and $F_{S.i,thresh}$ if $\hat{\tau}_{ext,col} > \tau_{thresh}$ and/or if $\hat{F}_{ext,S.i} > F_{S.i,thresh}$;
- determining (S10) contact locations $r_C$ of collisions with the kinematic chain structure by calculating a line of force action $r_d + \lambda f_i / \|f_i\|$ with $r_d = (S^T(f_i))^\# m_i$ of the collision and by intersecting the line of force action with the kinematic chain structure geometry;
- based on the determined contact locations $r_C$ determining (S11) the full contact Jacobians $J_{C,i} = J_{c,i} J_i$;
- determining (S12) the external wrenches: $(F_{ext,1}^T \ldots F_{ext,n}^T)^T = (J_{C.1}^T \ldots J_{C.n}^T)^\# \tau_{ext,col}$; and
- controlling (S13) the robot 1 dependent on $r_C$ and $(F_{ext,1}^T, \ldots F_{ext,n}^T)^T$.

Figure 3:
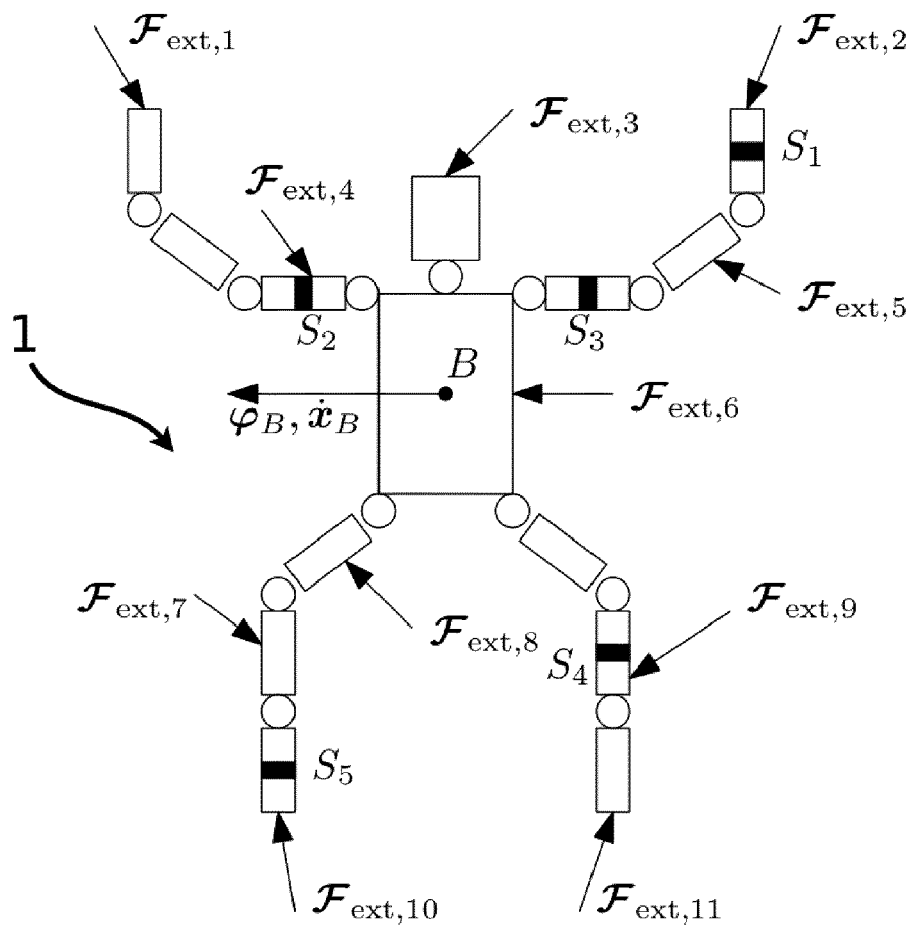
FIG. 3 shows a humanoid robot according to another embodiment of the invention.

FIG. 3 shows a humanoid robot 1 with a base B and arms and legs as kinematic chains, wherein a base orientation is denoted as $\varphi_B(t)$ and a base velocity is denoted as $\dot{x}(t)_B$. The humanoid robot 1 is in a multiple contact situation. Generalized external forces $F_{ext,i}$ are acting all over its structure. Forces on the feet originate from locomotion, forces on the hands originate from manipulation. Other external forces are caused by unwanted collisions. In addition, a number of force/torque sensors $S_i$ (five in the case of FIG. 3) are distributed arbitrarily along the kinematic chain structure of the robot 1. Two contacts are detected at the right arm. One by sensor $S_3$ and one by sensor $S_1$, as long as one contact is behind $S_1$ and the other between $S_3$ and S. As this is the case for $F_{ext,2}$ and $F_{ext,5}$ these two wrenches are estimated correctly. (Otherwise, the preferred proceeding is shown with equation (28)).

Figure 4:
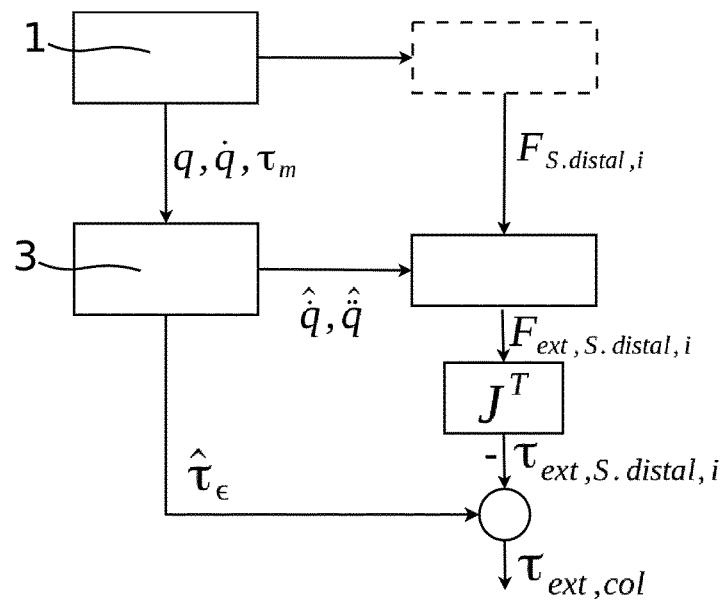
FIG. 4 shows a detailed excerpt of the method shown in FIG. 1.

FIG. 4 shows a detailed excerpt of the method shown in FIG. 1. Exclusion of external wrenches at the distal links $F_{ext,S.distal,i}$ measured by force/torque sensors $S_i$ from the observed generalized joint forces of equation (4) is done with the upper general description. These wrenches are therefore compensated according to equation (19) from the upper general description and allow for the mapping of $F_{S.distal,i}$ to $F_{ext,S.distal,i}$ with the load compenstion symbolized by a rectangle receiving $F_{S.distal,i}$ and $\ddot{q}, \dot{q}$ from the observer 3. All other notations and steps are described under the description corresponding to FIG. 1. The upper right dotted block outputting $F_{S.distal,i}$ is a filter.

Figure 5:
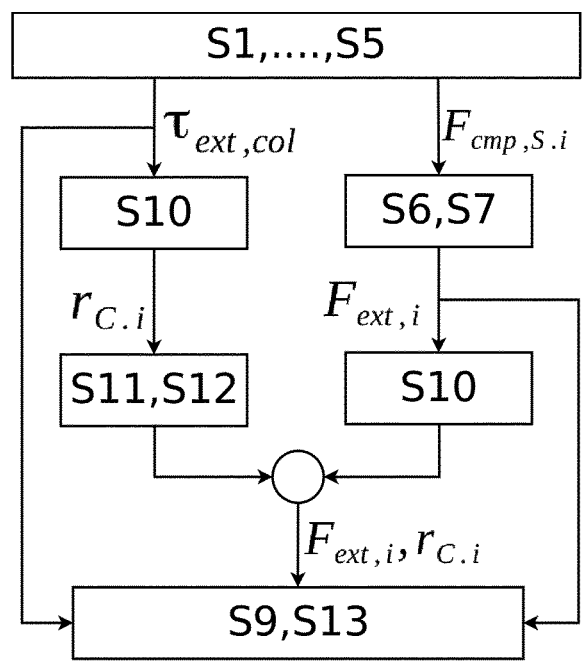
FIG. 5 shows another explanation of the method of FIG. 2.

FIG. 5 shows a different view of the steps explained under FIG. 2 and shows an overview of the collision detection, isolation, and identification algorithm. Hence, all steps S1 . . . S13 referred to under the description of FIG. 2 can also be applied to FIG. 5. Moreover, the general description from above, in particular, equations (17) to (19) are applicable. The more sensed or estimated or generated information is used, the more information can be obtained from the collision detection. If the collision detection is based on $\tau_{ext,col}$ only, the contact cannot be fully located. If $F_{ext,S.i}$ is used in addition, the contact can be located to the parts of the robot lying between the detecting and the following sensors. If the full $F_{ext,S.i}$ are available, collision detection can be done on a per link basis.

LIST OF REFERENCE NUMERALS 1 robot
3 observer
S1 provide
S2 measure and/or estimate
S3 measure and/or estimate
S4 generate
S5 generate
S6 estimate
S7 compensate
S8 compensate
S9 detect
S10 determine
S11 determine
S12 determine
S13 control

The invention claimed is:

1. A method of collision handling for a robot with a kinematic chain structure comprising at least one kinematic chain, wherein the kinematic chain structure comprises a base, links, joints connecting the links, actuators and at least one end-effector, a sensor $S_{distal,i}$ in a most distal link of at least one of the kinematic chains for measuring/estimating force/torque, and sensors $S_i$ for measuring/estimating proprioceptive data, wherein the sensors $S_i$ are arbitrarily positioned along the kinematic chain structure, the method comprising:
- providing a model describing dynamics of the robot;
- measuring and/or estimating with sensor $S_{distal,i}$ force or torque $F_{ext,S.distal,i}$ in the most distal link of at least one of the kinematic chains;
- measuring and/or estimating with the sensors $S_i$ proprioceptive data: base and robot generalized coordinates $q(t)$ and their time derivative $\dot{q}(t)$, generalized joint motor forces $\tau_m$, external forces $F_S$, a base orientation $\varphi_B(t)$ and a base velocity $\dot{x}(t)_B$;
- generating an estimate $\hat{\tau}_\in$ of generalized external forces $\tau_{ext}$ with a momentum observer based on at least one of the proprioceptive data and the model;
- generating an estimate $\ddot{q}(t)$ of a second derivative of base and robot generalized coordinates $\ddot{q}(t)$, based on $\hat{\tau}_\in$ and $\tau_m$;

estimating a Cartesian acceleration $\ddot{x}_D$ of a point D on the kinematic chain structure based on $\ddot{q}(t)$;

compensating $F_S$ for rigid body dynamics effects based on $\ddot{x}_D$ and for gravity effects to obtain an estimated external wrench $\hat{F}_{ext,S.i}$;

compensating $\hat{\tau}_{\in}$ for a Jacobian $J_{S.distal.i}{}^T$ transformed $F_{ext,S.distal.i}$ to obtain an estimation $\tau_{ext,col}$ of generalized joint forces originating from unexpected collisions; and detecting a collision based on given thresholds $\tau_{thresh}$ and $F_{S.i,thresh}$ if $\tau_{ext,col} > \tau_{thresh}$ and/or if $\hat{F}_{ext,S.i} > F_{S.i,thresh}$.

2. The method according to claim 1, further comprising generating recursively compensation wrenches for compensating the external forces $F_S$ for rigid body dynamics effects based on $\ddot{x}_D$ and for gravity effects to obtain an estimated external wrench $\hat{F}_{ext,S.i}$, if multiple sensors S are attached to one of the joints or links.

3. The method according to claim 1, further comprising determining contact locations $r_C$ of collisions with the kinematic chain structure by calculating a line of force action $r_d + \lambda f_i / \|f_i\|$ with $r_d = (S^T(f_i))^{\#} m_i$ of the collision and by intersecting the line of force action with the kinematic chain structure geometry.

4. The method according to claim 3, further comprising:
determining full contact Jacobians $J_{C.i} = J_{c,i} J_i$ based on the determined contact locations $r_C$; and
determining the external wrenches $(F_{ext,1}{}^T \ldots F_{ext,n}{}^T) = (J_{C.1}{}^T \ldots J_{C.n}{}^T)^{\#} \tau_{ext,col}$.

5. The method according to claim 4, further comprising controlling the robot dependent on $r_C$ and $(F_{ext,1}{}^T \ldots F_{ext,n}{}^T)^T$.

6. The method according to claim 1, wherein the robot is a humanoid robot.

7. A robot capable of collision handling, the robot comprising a kinematic chain structure comprising at least one kinematic chain, wherein the kinematic chain structure comprises a base, links, joints connecting the links, actuators and at least one end-effector, a sensor $S_{distal.i}$ in a most distal link of at least one of the kinematic chains for measuring/estimating force/torque, and sensors $S_i$ for measuring/estimating proprioceptive data, wherein the sensors $S_i$ are arbitrarily positioned along the kinematic chain structure, the robot designed and set up to:

provide a model describing dynamics of the robot;
measure and/or estimate with sensor $S_{distal.i}$ force or torque $F_{ext,S.distal.i}$ in the most distal link of at least one of the kinematic chains;
measure and/or estimate with the sensors $S_i$ proprioceptive data: base and robot generalized coordinates $q(t)$ and their time derivative $\dot{q}(t)$, generalized joint motor forces $\tau_m$, external forces $F_S$, a base orientation $\varphi_B(t)$ and a base velocity $\dot{x}(t)_B$;
generate an estimate $\hat{\tau}_{\in}$ of generalized external forces $\tau_{ext}$ with a momentum observer based on at least one of the proprioceptive data and the model;
generate an estimate $\ddot{q}(t)$ of a second derivative of base and robot generalized coordinates $\ddot{q}(t)$, based on $\hat{\tau}_{\in}$ and $\tau_m$;
estimate a Cartesian acceleration $\ddot{x}_D$ of a point D on the kinematic chain structure based on $\ddot{q}(t)$;
compensate $F_S$ for rigid body dynamics effects based on $\ddot{x}_D$ and for gravity effects to obtain an estimated external wrench $\hat{F}_{ext,S.i}$;
compensate $\hat{\tau}_{\in}$ for a Jacobian $J_{S.distal.i}{}^T$ transformed $F_{ext,S.distal.i}$ to obtain an estimation $\tau_{ext,col}$ of generalized joint forces originating from unexpected collisions; and
detect a collision based on given thresholds $\tau_{thresh}$ and $F_{S.i,thresh}$ if $\hat{\tau}_{ext,col} > \tau_{thresh}$ and/or if $\hat{F}_{ext,S.i} > F_{S.i,thresh}$.

8. The robot according to claim 7, wherein the robot comprises a data interface with a data network, and wherein the robot is designed and set up to download system programs for setting up and controlling the robot from the data network.

9. The robot according to claim 7, wherein the robot is designed and set up to download parameters for the system programs from the data network.

10. The robot according to claim 7, wherein the robot is designed and set up to enter parameters for the system programs via a local input interface and/or via a teach-in process, and wherein the robot is manually guided.

11. The robot according to claim 7, wherein the robot is designed and set up such that downloading system programs and/or respective parameters from the data network is controlled by a remote station, the remote station being part of the data network.

12. The robot according to claim 7, wherein the robot is designed and set up such that system programs and/or respective parameters locally available at the robot are sent to one or more participants of the data network based on a respective request received from the data network.

13. The robot according to claim 7, wherein the robot is designed and set up such that system programs with respective parameters available locally at the robot are capable of being started from a remote station, the remote station being part of the data network.

14. The robot according to claim 7, wherein the robot is designed and set up such that the remote station and/or the local input interface comprises a human-machine interface HMI designed and set up for entry of system programs and respective parameters, and/or for selecting system programs and respective parameters from a multitude of system programs and respective parameters.

15. The robot according to claim 14, wherein the human-machine interface HMI is designed and set up such that entries are possible via drag-and-drop entry on a touchscreen, a guided dialogue, a keyboard, a computer-mouse, a haptic interface, a virtual-reality interface, an augmented-reality interface, an acoustic interface, via a body tracking interface, based on electromyographic data, based on electroencephalographic data, via a neuronal interface, or a combination thereof.

16. The robot according to claim 14, wherein the human-machine interface HMI is designed and set up to deliver additive, visual, haptic, olfactory, tactile, electrical feedback, or a combination thereof.

17. The robot according to claim 7, further designed and set up to generate recursively compensation wrenches for compensating the external forces $F_S$ for rigid body dynamics effects based on $\ddot{x}_D$ and for gravity effects to obtain an estimated external wrench $\hat{F}_{ext,S.i}$, if multiple sensors S are attached to one of the joints or links.

18. The robot according to claim 7, further designed and set up to determine contact locations $r_C$ of collisions with the kinematic chain structure by calculating a line of force action $r_d + \lambda f_i / \|f_i\|$ with $r_d = (S^T(f_i))^{\#} m_i$ of the collision and by intersecting the line of force action with the kinematic chain structure geometry.

19. The robot according to claim 18, further designed and set up to:
  determine full contact Jacobians $J_{C.i}=J_{c,i}J_i$ based on the determined contact locations $r_C$; and
  determine the external wrenches $(F_{ext,1}{}^T \ldots F_{ext,n}{}^T)^T = (J_{C.1}{}^T \ldots J_{C.n}{}^T)^{\#}\tau_{ext,col}$.

20. The robot according to claim 18, further designed and set up to control the robot dependent on $r_C$ and $(F_{ext,1}{}^T \ldots F_{ext,n}{}^T)^T$.

21. A system for collision handling of a robot, the robot comprising a kinematic chain structure comprising at least one kinematic chain, wherein the kinematic chain structure comprises a base, links, joints connecting the links, actuators and at least one end-effector, a sensor $S_{distal.i}$ in a most distal link of at least one of the kinematic chains for measuring/estimating force/torque, and sensors $S_i$ for measuring/estimating proprioceptive data, wherein the sensors $S_i$ are arbitrarily positioned along the kinematic chain structure, the system comprising:
  a data processing device; and
  a memory storing instructions that, when executed by the data processing device, cause the data processing device to perform operations comprising:
    providing a model describing dynamics of the robot;
    measuring and/or estimating with sensor $S_{distal.i}$ force or torque $F_{ext,S.distal.i}$ in the most distal link of at least one of the kinematic chains;
    measuring and/or estimating with the sensors $S_i$ proprioceptive data: base and robot generalized coordinates $q(t)$ and their time derivative $\dot{q}(t)$, generalized joint motor forces $\tau_m$, external forces $F_S$, a base orientation $\varphi_B(t)$ and a base velocity $\dot{x}(t)_B$;
    generating an estimate $\hat{\tau}_\in$ of generalized external forces $\tau_{ext}$ with a momentum observer based on at least one of the proprioceptive data and the model;
    generating an estimate $\ddot{q}(t)$ of a second derivative of base and robot generalized coordinates $\ddot{q}(t)$, based on $\hat{\tau}_\in$ and $\tau_m$;
    estimating a Cartesian acceleration $\ddot{x}_D$ of a point D on the kinematic chain structure based on $\ddot{q}(t)$;
    compensating $F_S$ for rigid body dynamics effects based on $\ddot{x}_D$ and for gravity effects to obtain an estimated external wrench $\hat{F}_{ext,S.i}$;
    compensating $\hat{\tau}_\in$ for a Jacobian $J_{S.distal.i}{}^T$ transformed $F_{ext,S.distal.i}$ to obtain an estimation $\tau_{ext,col}$ of generalized joint forces originating from unexpected collisions; and
    detecting a collision based on given thresholds $\tau_{thresh}$ and $F_{S.i,thresh}$ if $\hat{\tau}_{ext,col} > \tau_{thresh}$ and/or if $\hat{F}_{ext,S.i} > F_{S.i,thresh}$.

22. A non-transitory storage medium storing instructions for collision handling of a robot, the robot comprising a kinematic chain structure comprising at least one kinematic chain, wherein the kinematic chain structure comprises a base, links, joints connecting the links, actuators and at least one end-effector, a sensor $S_{distal.i}$ in a most distal link of at least one of the kinematic chains for measuring/estimating force/torque, and sensors $S_i$ for measuring/estimating proprioceptive data, wherein the sensors $S_i$ are arbitrarily positioned along the kinematic chain structure, the instructions when executed by a data processing device cause the data processing device to perform operations comprising:
  providing a model describing dynamics of the robot;
  measuring and/or estimating with sensor $S_{distal.i}$ force or torque $F_{ext,S.distal.i}$ in the most distal link of at least one of the kinematic chains;
  measuring and/or estimating with the sensors $S_i$ proprioceptive data: base and robot generalized coordinates $q(t)$ and their time derivative $\dot{q}(t)$, generalized joint motor forces $\tau_m$, external forces $F_S$, a base orientation $\varphi_B(t)$ and a base velocity $\dot{x}(t)_B$;
  generating an estimate $\hat{\tau}_\in$ of generalized external forces $\tau_{ext}$ with a momentum observer based on at least one of the proprioceptive data and the model;
  generating an estimate $\ddot{q}(t)$ of a second derivative of base and robot generalized coordinates $\ddot{q}(t)$, based on $\hat{\tau}_\in$ and $\tau_m$;
  estimating a Cartesian acceleration $\ddot{x}_D$ of a point D on the kinematic chain structure based on $\ddot{q}(t)$;
  compensating $F_S$ for rigid body dynamics effects based on $\ddot{x}_D$ and for gravity effects to obtain an estimated external wrench $\hat{F}_{ext,S.i}$;
  compensating $\hat{\tau}_\in$ for a Jacobian $J_{S.distal.i}{}^T$ transformed $F_{ext,S.distal.i}$ to obtain an estimation $\tau_{ext,col}$ of generalized joint forces originating from unexpected collisions; and
  detecting a collision based on given thresholds $\tau_{thresh}$ and $F_{S.i,thresh}$ if $\hat{\tau}_{ext,col} > \tau_{thresh}$ and/or if $\hat{F}_{ext,S.i} > F_{S.i,thresh}$.

* * * * *